March 18, 1952 A. F. ZAMIS 2,589,759
GEAR-CUTTING APPARATUS
Filed April 10, 1947 6 Sheets-Sheet 3
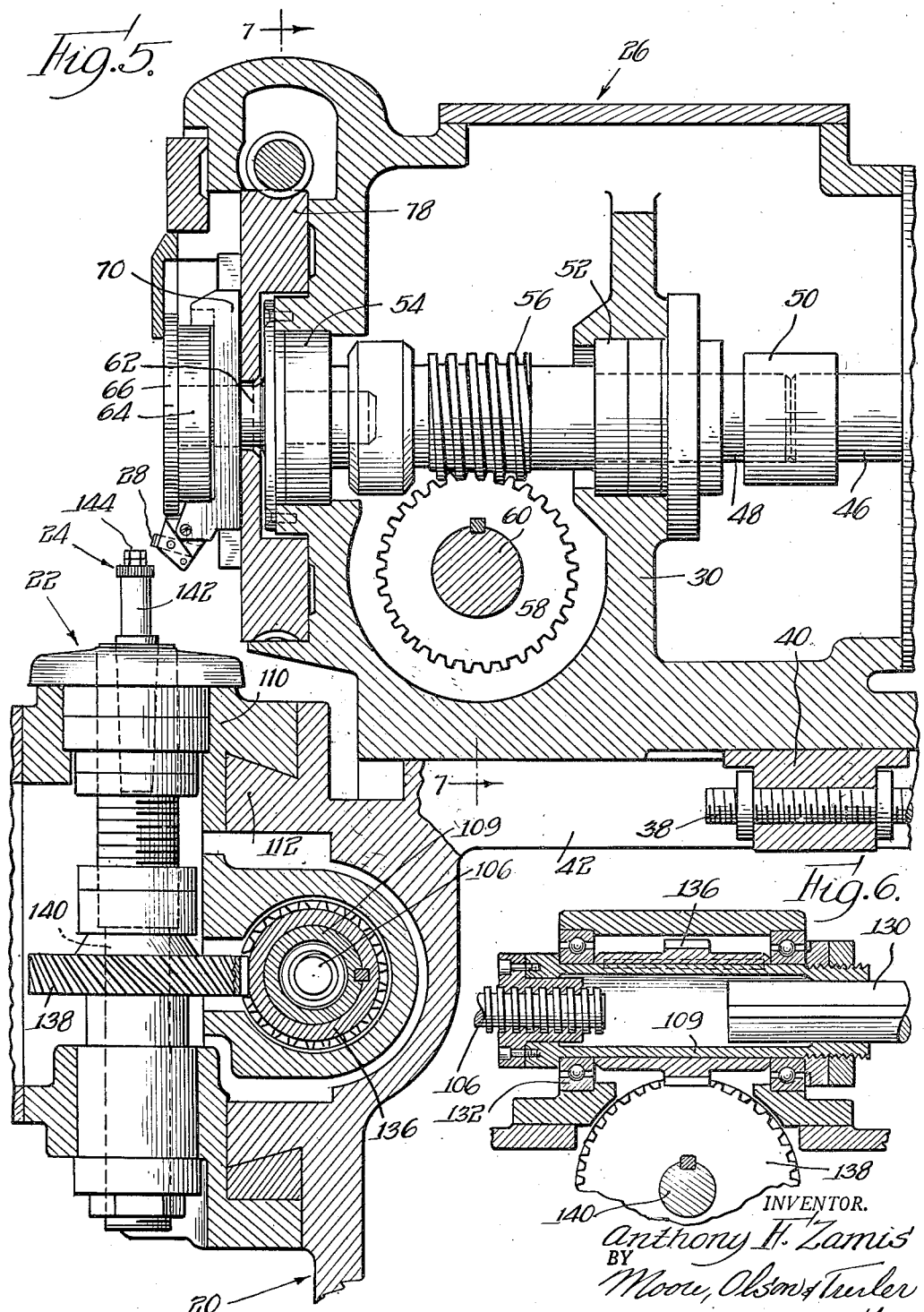

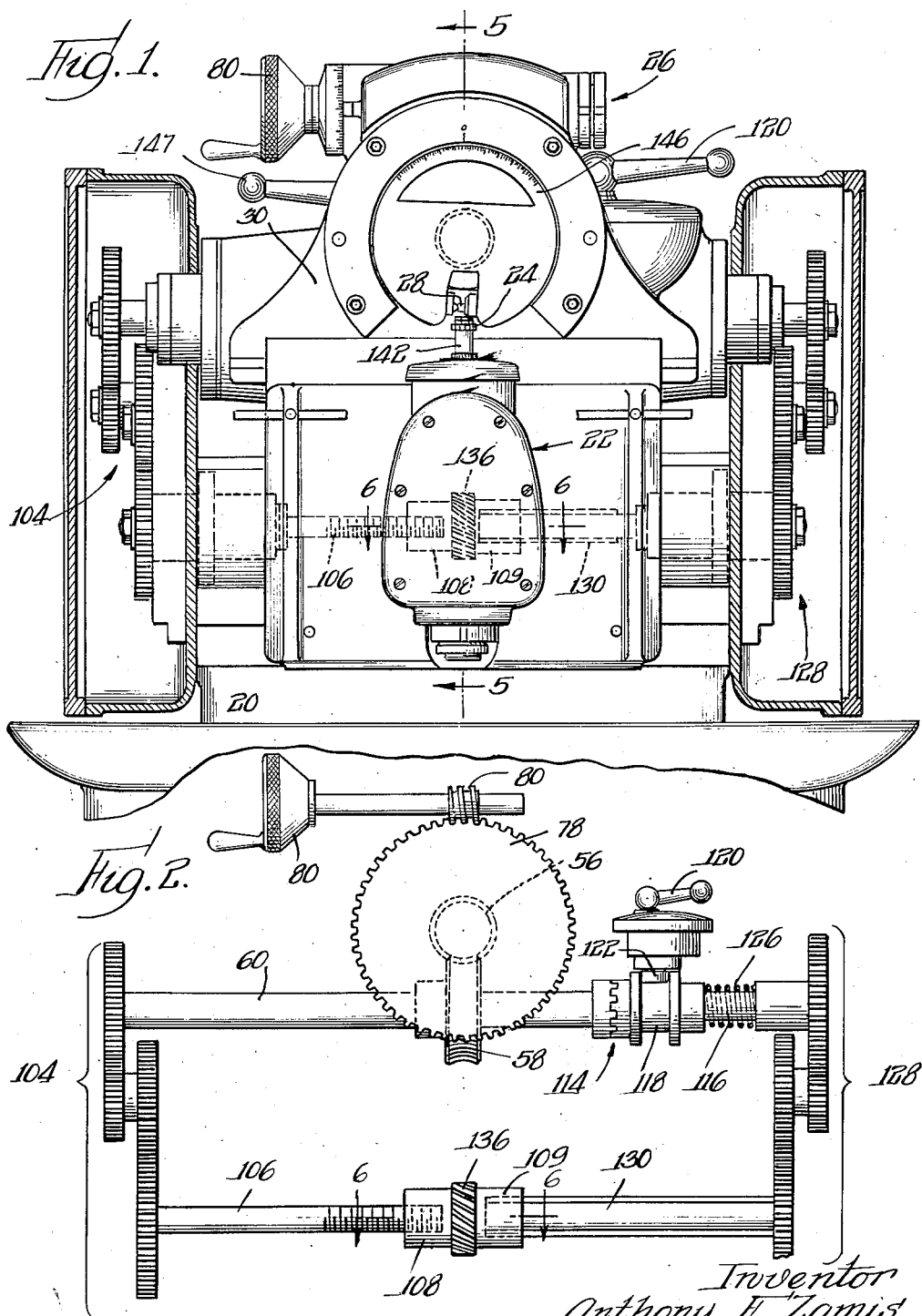

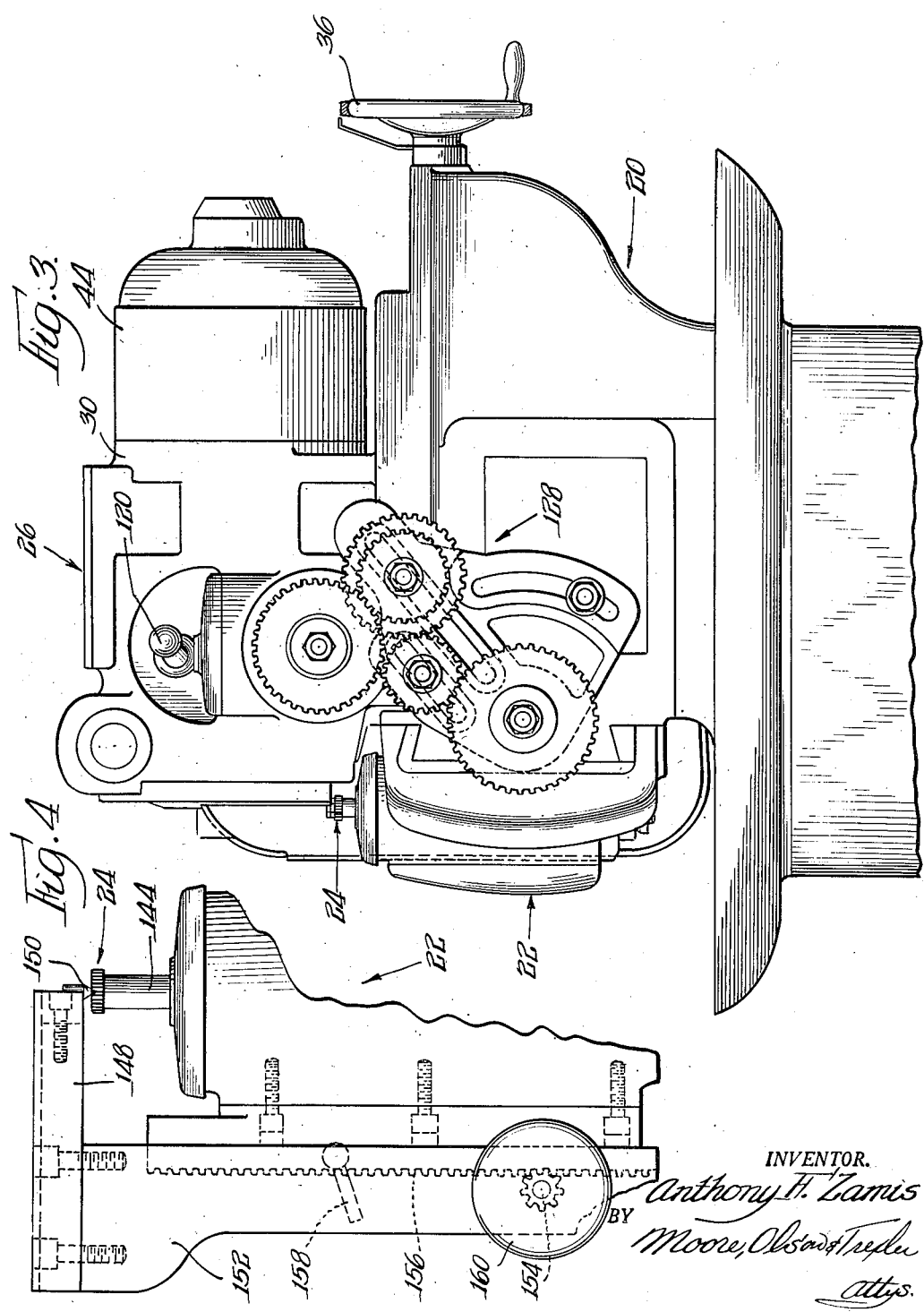

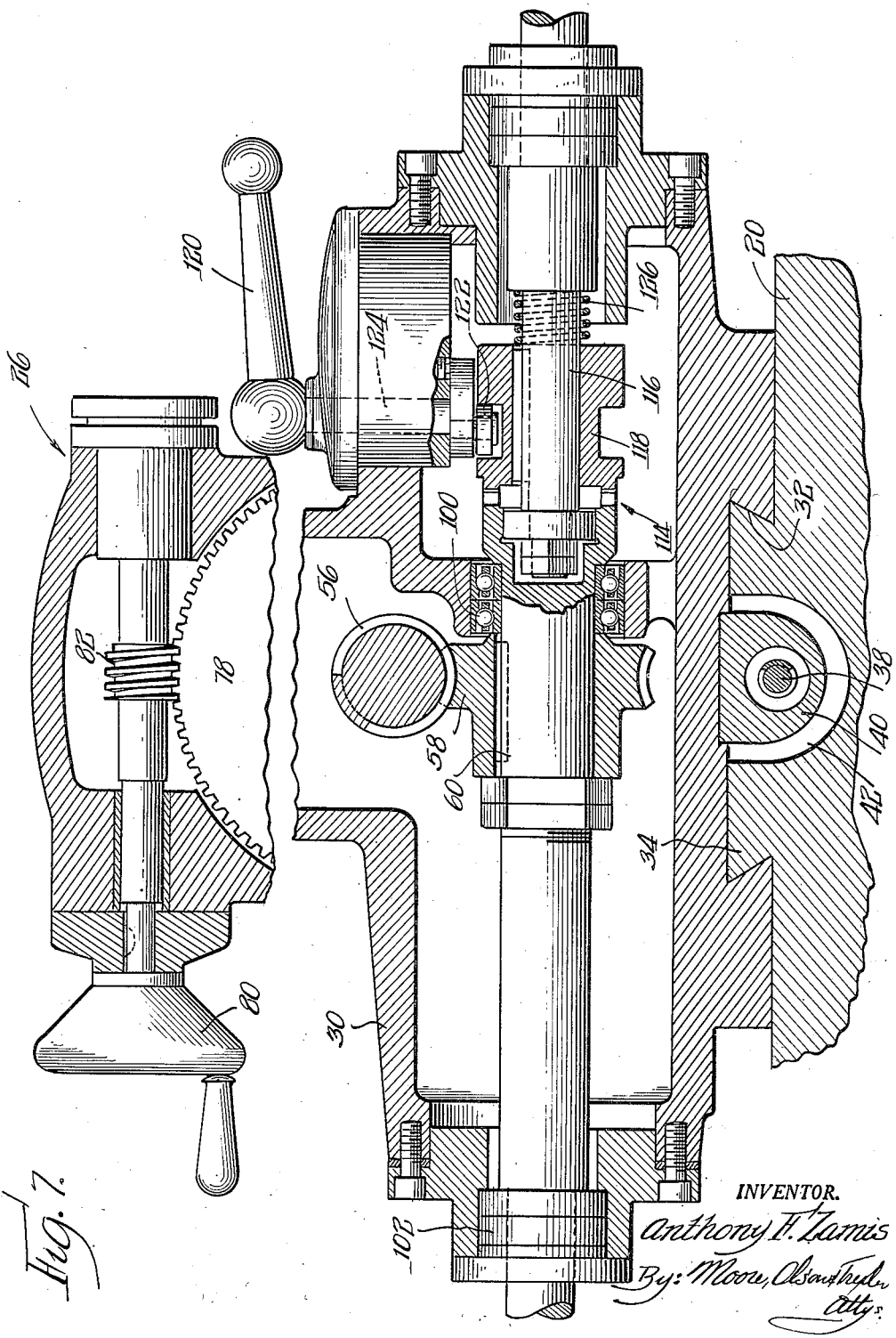

March 18, 1952 A. F. ZAMIS 2,589,759
GEAR-CUTTING APPARATUS
Filed April 10, 1947 6 Sheets-Sheet 5
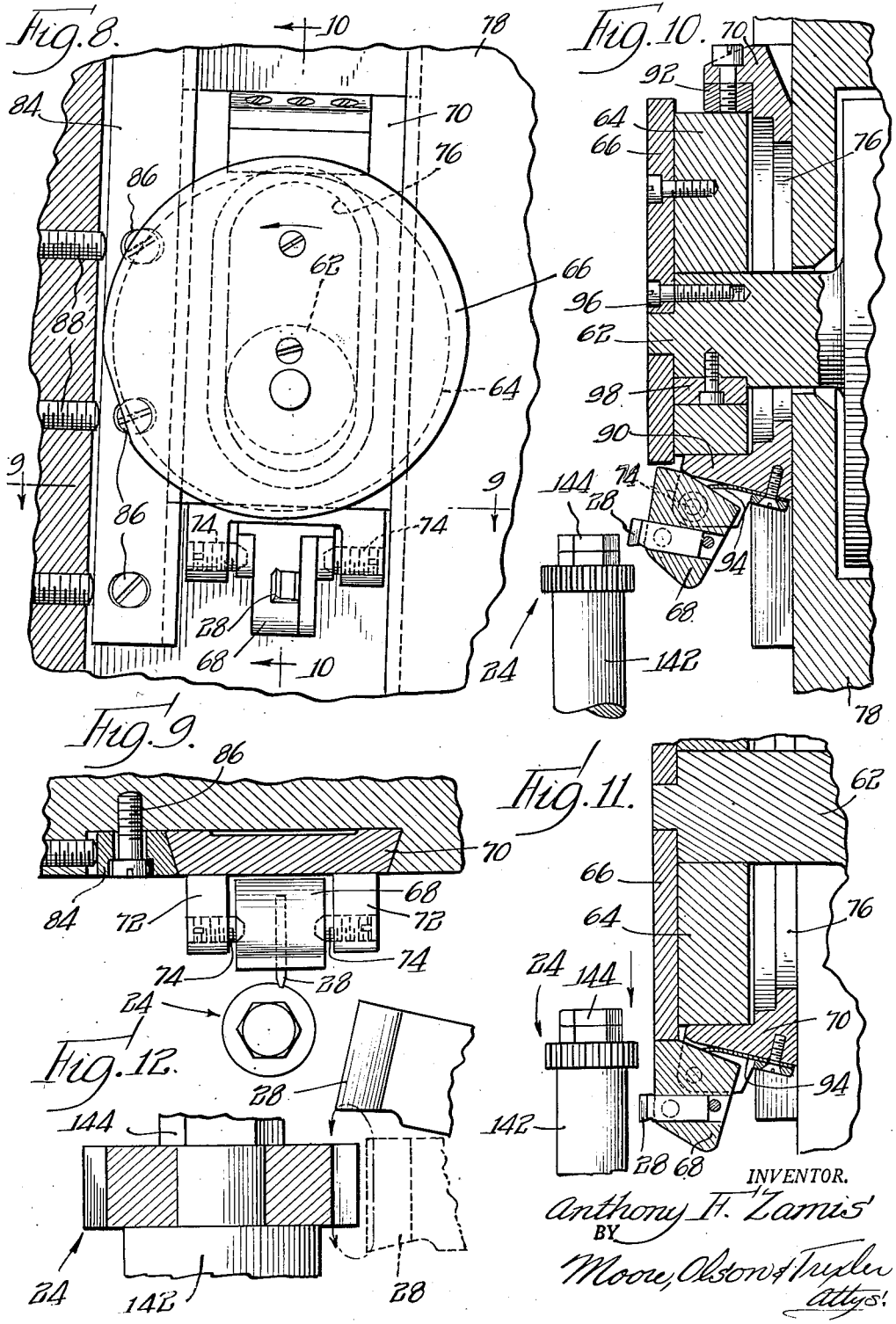

March 18, 1952  A. F. ZAMIS  2,589,759
GEAR-CUTTING APPARATUS
Filed April 10, 1947  6 Sheets-Sheet 6
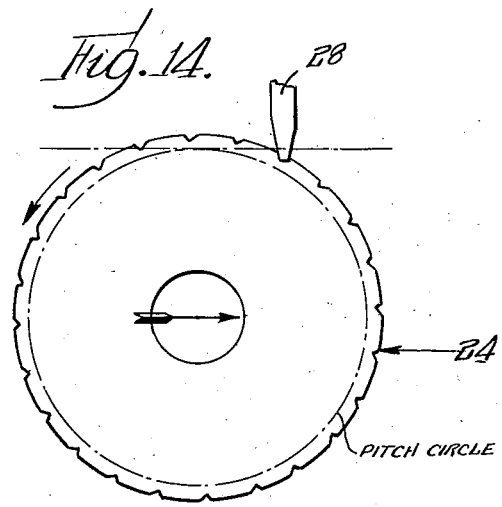
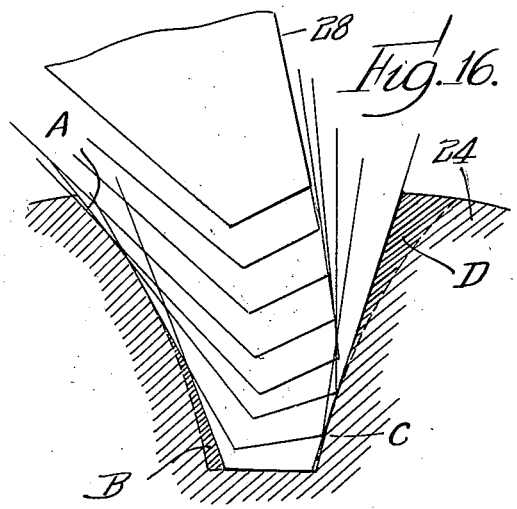
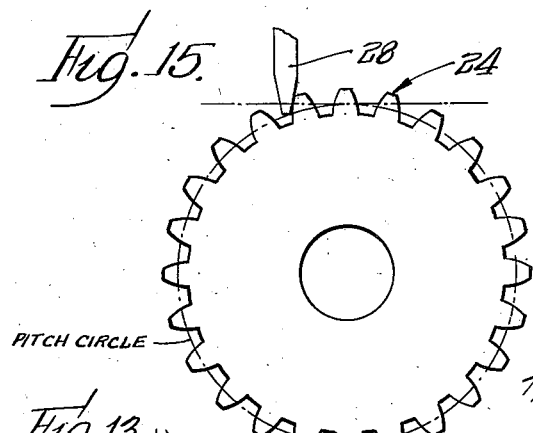
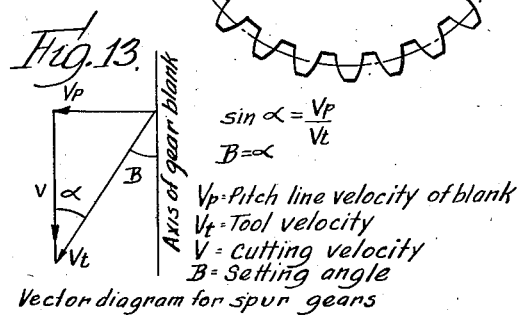
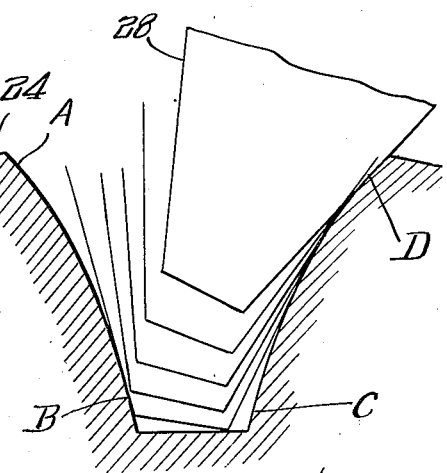
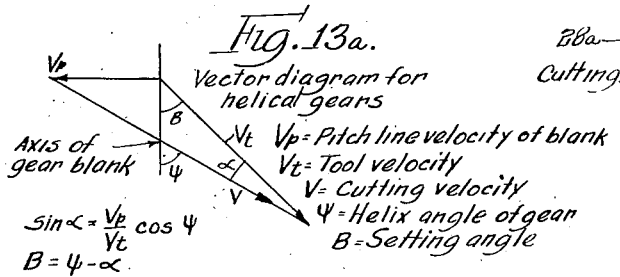
INVENTOR.
Anthony F. Zamis
BY
Moore, Olson & Trexler
Attys.

Patented Mar. 18, 1952

2,589,759

UNITED STATES PATENT OFFICE 2,589,759

GEAR-CUTTING APPARATUS

Anthony F. Zamis, Chicago, Ill., assignor to Illinois Tool Works, Chicago, Ill., a corporation of Illinois Application April 10, 1947, Serial No. 740,599

8 Claims. (Cl. 90—8)

This invention relates generally to gear cutting machines, and more particularly to machines equipped with reciprocable tools adapted to produce teeth by cutting across the periphery of a gear blank.

For many years various types of tools have been used to cut or generate teeth in a gear blank. One of the most common of these tools is the hob. The teeth of the rotating hob serve to generate, by a number of successive cuts, gear teeth along a rotating blank. A hob is a rather expensive tool to produce, and therefore its use is only practical in instances where the work to be done will justify such expense. In fact, in many instances it has not proven practical to employ hobs or even gear shaper cutters in the manufacture of fine pitch gears. It is one of the important objects of the present invention to provide mechanism whereby fine pitch gear teeth may be produced both economically and accurately. To this end the invention contemplates the use of a reciprocable tool which is extremely simple in construction and very inexpensive to manufacture to a high degree of accuracy. More particularly there is contemplated by the present invention a novel arrangement for controlling and operating a tool having a single cutting tooth as distinguished from other forms of cutters such as hobs or the like which have a multiplicity of teeth.

The present invention is not only concerned with the use of the above mentioned simple and inexpensive tool for cutting teeth in the periphery of a gear blank, but also in a machine particularly designed to accommodate such a tool. That is to say, the invention comprehends a machine for accurately correlating the reciprocable movements of the aforesaid cutting tool and the continuous rotation of a gear blank. Such a machine must be capable of causing a gear blank not only to rotate about its axis as the tool reciprocates across the blank periphery, but also to experience a rolling action upon its pitch circle in order to effect the generation of equally spaced teeth in its periphery.

Due to the very nature of the problem involved in the generation of a gear tooth profile by the use of a reciprocable tool acting upon a rotary gear blank, it is very important that the tool velocity during its cutting stroke be absolutely uniform. For instance, such uniform velocity insures parallelism of spur gear teeth or uniform lead if helical gears are being cut. The present invention therefore contemplates a machine or apparatus of improved novel design capable of imparting absolute uniform velocity to the reciprocable tool during its cutting stroke. In solving this problem one of the main objects is to provide a machine which is adapted to not only produce very accurate gear teeth, but also a machine of simple, yet sturdy, design having a minimum number of constituent parts.

A further object of the present invention is to provide gear cutting apparatus of the type referred to above, in which the cutting tool may be reciprocated at a relatively rapid rate during the continuous rotation of a gear blank. As the tool cuts across the periphery of the blank a small increment of stock is removed. In order to compensate for the rotation of the gear blank, the tool must travel along a path which is angularly disposed to the axis of the blank. The invention proposes the use of a very simple, yet easily adjustable, tool supporting structure, and also novel means for causing the tool to clear the work surface on its return stroke.

More specifically, the present invention proposes the use of novel and highly practicable cam means for effecting reciprocation of the tool and the automatic shifting thereof to provide clearance on its return stroke.

It is a further object of the present invention to provide gear cutting apparatus which will enable gear teeth of varying sizes, pitch, etc., to be cut, and to this end the invention proposes means functioning in timed relation with any selected speed of reciprocation to cause the gear blank to rotate and roll along its pitch circle at the required rate. Variation of speed of reciprocation of the cutting tool is contemplated to accommodate various materials of differing hardness and cutability which may be worked upon.

Still more specifically, the invention contemplates in association with gear cutting apparatus of the type previously referred to, a variable speed prime mover and gear change mechanisms to produce various correlated speeds of tool reciprocation and gear blank movement.

The foregoing and other objects and advantages will be more apparent from the following detailed description, when considered in connection with the accompanying drawings, wherein:

Fig. 1 is a front elevational view of a gear cutting machine which is representative of one embodiment of the present invention;

Fig. 2 is a semi-diagrammatic view to more clearly illustrate the arrangement of the drive shafts and gear change mechanisms, as well as the screw and spline shaft mechanisms, as viewed in Fig. 1;

Fig. 3 is a side elevational view of the machine, as seen from the right of Fig. 1;

Fig. 4 is a fragmentary view of the front lower portion of the machine, as seen in Fig. 3, illustrating the manner in which the arbor for carrying the gear blank may be supported from above by a dead center;

Fig. 5 is an enlarged vertical transverse sectional view of the front portion of the machine taken substantially along the line 5—5 of Fig. 1;

Fig. 6 is an enlarged detailed sectional view of the screw and spline shaft coupling arrangement, said view being taken substantially along the line 6—6 of Fig. 1;

Fig. 7 is an enlarged transverse vertical sectional view taken substantially along the line 7—7 of Fig. 5, portions of the adjustable tool supporting plate being broken away to more clearly illustrate the structural details of the mechanism positioned to the rear thereof;

Fig. 8 is an enlarged fragmentary detailed elevational view of the cam means for actuating the cutting tool, said view being taken from the front of the machine with the graduated front plate removed to expose the parts otherwise hidden thereby;

Fig. 9 is a detailed horizontal sectional view to more clearly illustrate the block for pivotally supporting the cutting tool, said view being taken substantially along the line 9—9 of Fig. 8;

Fig. 10 is a vertical sectional view of the cam mechanisms taken substantially along the line 10—10 of Fig. 8; in this figure the tool is shown in its uppermost position in readiness to make a downward cutting stroke;

Fig. 11 is a fragmentary view similar to Fig. 10 illustrating the position occupied by the tool when it has completed its cutting stroke and shifted to its position of work clearance in readiness to be moved upwardly;

Fig. 12 is an enlarged fragmentary view illustrating the path followed by the cutting tool during its cycle of reciprocation;

Fig. 13 diagrammatically illustrates the manner in which the angular setting of the cutting tool is calculated;

Fig. 13a diagrammatically illustrates the manner in which the angular setting of the cutting tool is calculated for helical gears;

Fig. 14 diagrammatically illustrates the relative positions of the cutting tool and gear blank during the initial stage of the cutting operation;

Fig. 15 is a diagrammatic illustration similar to Fig. 14 disclosing the relative position of the gear blank and cutting tool as the gear cutting operation is about to be completed;

Fig. 16 is a diagrammatic illustration of the various cuts taken by the cutting tool during the first half of its cycle of cutting;

Fig. 17 diagrammatically illustrates a series of cuts taken during the latter half of the cutting operation; and Fig. 18 illustrates a modified form of cutting tool having a tooth capable of producing a cutting action, a tooth for finishing, as well as a tooth for burnishing.

Referring now to the drawings more in detail, wherein like numerals have been employed to designate like parts throughout the various figures, it will be seen that one embodiment of the invention consists of a supporting bed designated generally by the numeral 20, Figs. 1 and 3. Associated with the front portion of the bed 20 is a horizontally shiftable carriage 22 for supporting a gear blank, the gear blank being designated by the numeral 24. Horizontally adjustable along the upper surface of the bed 20 is a tool operating unit designated generally by the numeral 26. The forward extremity of this unit 26 supports a cutting tool 28 which is adapted to be reciprocated across the peripheral surface of the gear blank 24 in a manner later to be described.

*Tool driving unit*

In the interest of clarity in presentation, the tool driving unit or mechanism 26 will first be described. This unit consists of a main housing or frame structure 30, the underside of which is provided with a dovetail 32, Fig. 7, for accommodating a complementary guide member 34 formed integral with and projecting above the upper surface of the bed 20. It will thus be apparent that the tool driving unit 26 may be adjusted along the guide member 34 through the agency of a hand-wheel 36 connected with a suitable screw member 38, Figs. 3, 5 and 7, which operates within a nut block 40 secured to the underside of the frame member 30. The upper portion of the bed 20 is provided with a longitudinal recess 42 for accommodating the above mentioned screw and nut block construction.

Mounted on the rearward portion of the frame 30 is a prime mover or electric motor 44, the drive shaft 46 of which is suitably coupled to a driving spindle 48, Fig. 5, by means of a coupling member 50. The electric motor 44 is preferably of the variable speed type capable of imparting various rotating speeds to the driving spindle 48. It will be seen from Fig. 5 that the driving spindle 48 is mounted at one end within a suitable bearing 52 carried by the frame 30, and at its opposite end within a suitable bearing 54 also carried by the frame 30. The intermediate portion of the spindle or shaft 48 is provided with a worm 56 which engages a worm wheel 58 keyed to a horizontally disposed shaft 60, best shown in Fig. 7. The forward or left extremity of the spindle 48, as shown in Fig. 5, is coupled with a stub shaft 62 which projects outwardly from the frame 30 a sufficient distance to accommodate a pair of tool actuating cams 64 and 66.

The arrangement of the cams 64 and 66 may best be understood from Figs. 8 to 12, inclusive. The cam 64 serves to impart one complete cycle of reciprocation to the tool 28 during each rotation of the drive shaft 62. The cam 66 serves to impart a tilting movement to the tool 28 upon the completion of the cutting stroke of the tool, and thereby causes the tool to clear the gear blank 24 as it moves upwardly. The functioning of the cams will be more apparent when it is understood that the tool 28 proper is carried within a tool holder or block 68 which is pivotally supported at the lower extremity of a reciprocable carriage 70. As shown in Fig. 9, the tool holder or clapper block 68 is positioned between ears 72 and is pivotally supported from opposite sides by screw members or pins 74. The carriage 70 is provided with an elongated central aperture 76 to enable clearance of the drive shaft 62. The carriage 70 is reciprocably supported on the front side of a rotatably adjustable disc or plate 78. This plate 78 may be rotatably adjusted by turning a hand-wheel 80 which is coupled with a worm 82, Fig. 7. This worm 82 meshes with teeth along the periphery of the adjustable plate 78. The purpose of angularly adjusting the direction of reciprocation of the tool 28 will be more apparent as the description progresses. As illustrated in Fig. 8, an adjustable guide member 84 provides one side of the guideway in which the tool carriage 70 reciprocates. This guide member or gib 84 is secured in position by means of screws 86 extending through the member and by screws 88 adapted to clampingly engage the side edge of the member.

It will be noted that the lower extremity of the reciprocable carriage has a forwardly projecting portion 90 positioned below the cam 64, and a hardened block 92 positioned above said cam. Thus, as the cam rotates between the projection 90 and the block 92, reciprocation is imparted to the carriage 70 and consequently to the tool member 28. As the cam causes the carriage 70 to move downwardly from the position shown in Fig. 10, the cutting end of the tool 28 moves across the peripheral surface of the gear blank 24. As the tool reaches the lower limit of its cutting range, the periphery of the cam 66 moves against the uppermost corner of the tool holder 68 so as to rotate the tool holder in a counterclockwise direction, as viewed in Fig. 11, a sufficient distance to effect clearance of the tool with the periphery of the gear blank 24. This clearance is maintained until the tool in its upward travel passes the gear blank. After passing the gear blank, the low point of the cam 66 passes the upper corner of the tool holder 68, thereby permitting a leaf or other type of spring 94 to urge the tool holder 68 in a clockwise direction so as to position the tool 28 for a subsequent cut. The cam 66 is secured to a reduced end of the shaft 62 by means of a screw 96, and the cam 64 is coupled with the shaft 62 as by means of a key 98, Fig. 10. From the foregoing, it will be apparent that during each rotation of the shaft 62 the tool 28 will experience a cutting stroke and a return stroke as well as a tilting movement to effect clearance with respect to the gear blank.

*Gear blank supporting and driving mechanism*

The description thus far has concerned only the reciprocation of the cutting tool. In order to cause gear teeth to be cut or generated along the periphery of the blank 24 by the reciprocable tool 28, it is essential that the blank be subjected first, to a continuous rotating movement which will index the gear blank as the cutting tool moves across the periphery thereof, and secondly, to a rolling movement which will cause the gear to roll along its pitch circle and thereby insure the generation of the involute profile. In Fig. 2 the driving mechanism for imparting the aforesaid rotary and rolling movement is semi-diagrammatically disclosed.

As previously pointed out, the worm 56, Figs. 2, 5 and 7, meshes with the worm wheel 58 keyed to the shaft 60. This shaft 60 is suitably mounted at one end within anti-friction bearings 100, and at its opposite extremity within anti-friction bearings 102. The left extremity of the shaft 60, as viewed in Figs. 2 and 7, is connected with suitable change gears included within a bracket 104, Fig. 2, and likewise designated generally by said numeral in Fig. 1. Rotation from the shaft 60 acting through the change gears 104 causes rotation of an actuating or feed screw 106. The feed screw 106 operates within a complementary nut 108, Figs. 1, 2 and 6, and this nut 108 is secured to a rotatable sleeve 109 which is longitudinally movable as a unit with the horizontally shiftable carriage 22. This carriage 22 includes a frame member 110, Fig. 5, which is adapted to shift horizontally along a guide member 112 provided along the front surface of the bed 20. From the foregoing description, it will be understood that the feed screw 106 and its complementary nut 108 serve to impart lateral movement or translation to the supported gear blank 24.

Referring now to the right extremity of the drive shaft 60 as viewed in Figs. 2 and 7, it will be seen that a clutch mechanism designated generally by the numeral 114 serves to couple the shaft 60 with a second coextensive drive shaft 116. It will suffice to say that by axially shifting a member 118 of the clutch 114 to the right through the agency of a manually operable handle 120, the shaft 116 may be disengaged from the shaft 60. This is accomplished by an eccentrically positioned roller 122 carried at the lower end of a vertical pin 124 which may be rotated by moving the handle 120. A coil spring 126 acts to normally urge the clutch member 118 to the left. The right extremity of the shaft 116 is coupled through a change gear mechanism 128 with a spline shaft 130. The shaft 130 has a splined coupling with the aforementioned sleeve 109. Thus rotation of the spline shaft 130 causes rotation of the sleeve 109. This sleeve 109 is rotatable within suitable anti-frictional bearings 132 mounted within the structure of the carriage 110, as clearly illustrated in Fig. 6. Encircling the sleeve 109 and keyed thereto is a helical gear 136 which meshes with a complementary helical gear 138 keyed to a vertical shaft 140. This shaft 140 is suitably mounted within bearings in the carriage 110, as clearly illustrated in Fig. 5. The upper extremity of the structure of the shaft 140 is constructed to accommodate, in frictional relation, due to the tapered shank, a work supporting arbor 142. The upper extremity of the arbor 142 carries the gear blank 24 and suitable fastening means such as nuts 144 serve to clamp the work piece to the arbor.

*Angular adjustment of cutting tool*

From the description thus far given, it will be apparent that the prime mover or electric motor 44 serves as the source of power supply for reciprocating the tool supporting slide 70 and for rotating the gear 24 through the splined connection 130—109, as well as laterally moving the gear through the action of the lead screw nut arrangement 106—108. Bearing in mind that the gear blank 24 is rotating as the cutting tool 28 cuts across the periphery of the blank, it will be appreciated that the tool must move along a path which is inclined to a line lengthwise parallel to the tooth generated. Thus, as shown in Fig. 8, the tool carriage 70 is inclined slightly to the direction lengthwise of the tooth so that spur gear teeth will be cut as the tool moves across the periphery of the rotating blank. In Figs. 13 and 13a diagrammatic illustrations are made of the method of calculating the angle of tool travel for spur and helical gears respectively. In these illustrations $V_t$ denotes velocity of the tool, $V_p$ the pitch line velocity of the gear blank, and $V$ the cutting velocity. In Fig. 1 a graduated plate 146 is shown which moves as a unit with the angularly adjustable plate 78, Fig. 5. Therefore, as the plate 78 is rotated in response to actuation of the hand-wheel 80 (as shown in Fig. 1), visual indication of the degree of angular adjustment is made readily apparent to the operator.

In this connection particular attention is directed to the cam means employed to effect reciprocation of the tool, to-wit, the cam member 64. In order to obtain the necessary pre-determined longitudinal configuration of the teeth being cut (such as spur or helical teeth) the present invention contemplates an arrangement whereby uniform velocity of the tool throughout the cutting range may be maintained. The cam 64 is especially designed to impart this uniformity of velocity to the tool. By employing this cam driving arrangement, it is possible to obtain uniform linear velocity of the tool without any intermediate or compensating driving mechanism. That is to say, the invention contemplates a tool driving mechanism coupled directly with the source of power which will cause the cutting tool to be driven through the cutting range at absolute uniform velocity. The path or orbit followed by the tool 28 is indicated clearly in Fig. 12. It is highly important when cutting gears with the arrangement shown herein to impart absolute uniformity of velocity to the tool as it moves downwardly along the vertical path through the cutting range, as indicated in Fig. 12.

As set forth above, it will be understood that the cutting tool moves at a uniform velocity throughout its cutting range, and the gear blank rotates at uniform angular velocity during that period of operation. The design of the cam is dependent upon the desired or ultimate lengthwise configuration of the tooth to be cut. Hence, the invention in its broader aspects contemplates cam contours of modified design and angular gear blank movement which are consistent with the ultimate tooth form desired. It is significant that the velocty of tool travel during its cutting range and the simultaneous angular displacement of the gear blank be accurately correlated to produce the desired lengthwise tooth configuration.

Statement of operation

Assume that it is desired to cut involute teeth in a gear blank such as the gear blank 24. This blank may be a blank of solid form or a blank which consists of a plurality of relatively thin discs clamped together on the arbor 142 by the nuts 144. In setting up the machine, a number of factors must first be taken into consideration, such as the outside diameter of the gear to be cut, number of teeth, circular pitch, etc. Such facts having been obtained, it is necessary to first mount the blank on the arbor 142 which is mounted into the upper end of the drive shaft structure 140. Angular adjustment of the tool 28 in accordance with the explanation illustrated in Figs. 13 or 13a is then made. As previously pointed out, this angle of adjustment must be correlated with the speed of rotation of the gear so that as the tool moves across the blank, the resulting gear tooth will be in absolute parallelism with the gear axis (Fig. 13) or the correct helix angle is obtained (Fig. 13a).

Further assuming that the blank is to be translated from left to right, as illustrated in Fig. 14, it will be necessary to position the cutting tool 28 to its proper depth of cut on the right side of the gear blank. This position is accomplished by turning the hand-wheel 36. Conventional graduations on the hand-wheel indicate the degree of movement imparted to the unit 26 supporting the tool 28. After adjustably positioning the tool 28, the unit 26 may be secured in place by operating a handle 147 of a conventional clamp (not shown). Proper gear trains 104 and 128 must also be selected for imparting rotary and rolling movement to the gear in correlation with the frequency of reciprocation of the tool.

The frequency of reciprocation of the tool is governed by the speed at which the variable speed motor 44 is set for actuation and the stroke speed thereof is governed by the shape of cam 64.

Figs. 14 to 17, inclusive, diagrammatically illustrate the action of the cutting tool. Fig. 14 illustrates the relative position of the tool and gear blank during the initial stages of the cutting operation. It will be apparent that in order for the tool 28 to cut a true involute as it reciprocates across the periphery of the blank, it is necessary that the blank, in effect, roll along its pitch circle. The gear train or change gear arrangement 128 acting through the spline shaft coupling 130—109 serves only to impart rotation to the blank, and therefore tangential movement or linear translation must also be imparted to the blank in order to simulate the above-mentioned rolling action. This translatory movement, as shown in Fig. 14, constitutes lateral translation of the blank in a direction parallel to a line which is tangent to the pitch circle of the gear being cut, and which also constitutes the pitch line of the tool. This linear translation is accomplished through the change gear mechanism 104 which rotates the feed screw 106 within the nut 108. Rotation is also imparted continuously to the nut 108 by the sleeve 109 driven from the spline shaft 130. However, the change gear combinations are so arranged that the rotation of the screw 106 and the superimposed rotation of the nut 108 and its sleeve 109 cause the gear blank to be translated or laterally shifted at a rate which would be experienced if the gear were to be rolled along its pitch circle. In addition to this so-called rolling action, the gear also experiences rotation in timed relation with the reciprocation of the tool, so as to enable the tool to make small cuts in rapid succession at spaced intervals along the gear blank periphery. Thus the gear blank is subjected to a rolling motion superimposed upon the above mentioned rotary motion.

The rotation of the gear blank, referred to herein, is a dual concept in that it affords what might be termed an indexing motion to determine the pitch or spacing of the teeth cut, while at the same time, taken in conjunction with the translatory movement described herein, it creates in effect a rolling or generating action in the blank. This rolling or generating action is, during operation, and as described above, superimposed upon the aforesaid indexing rotation.

As the gear blank 24 is translated from left to right, and rotated in a counter-clockwise direction, as illustrated in Fig. 14, the tool makes a rapid succession of light cuts across the gear periphery. Successive cuts made during approximately the first half of the complete cutting operation are illustrated in Fig. 16. It will be noted from this figure that the final cut of the involute profile has been made at the upper end of the tooth at the left side in the vicinity indicated by the letter A. Some stock still remains to be cut away at B located at the root portion of this tooth. Likewise, the involute surface in the area indicated by the letter C has about been completed, whereas the area D of the same tooth is yet to be cut away. The relative positions occupied by the tool 28 and the gear blank 24 during the final stages of cutting operation are illustrated in Fig. 15. In this figure the gear is about to move away from contact with the cutting tool. Fig. 17 diagrammatically illustrates the series of successive cuts made by the tool 28 during the last half of its cutting operation. During this period the involute in the vicinity of the letter B for the tooth at the left and in the vicinity of the letter D for the tooth at the right are completed. In the diagrammatic disclosures of Figs. 16 and 17 the tool 28 appears to assume different angular positions with respect to the gear. It will be apparent from the preceding description that the tool maintains the same angular position with the gear blank throughout the complete cycle of operation. For the purpose of simplicity in disclosure, various positions of the tool are illustrated, rather than to attempt to disclose various positions of the moving gear blank.

After the cutting operation has been completed and it is desired to return the carriage 22 to its starting position, the clutch mechanism 114 may be disengaged by turning the handle 120. Under such circumstances no rotation is imparted to the sleeve 109, and hence the greatly increased relative rotation between the screw 106 and the nut 108 will effect relatively rapid return movement of the carriage. In this manner the speed with which the machine may be reset for a subsequent cutting operation is materially enhanced.

In instances where it is thought necessary to provide added support for the upper end of the arbor 142, an overhanging arm 148 having a dead center 150 may be employed, as clearly shown in Fig. 4. This arm 148 is adjustably secured to the upper end of an auxiliary frame member 152. The frame member 152 may be vertically adjusted by means of a pinion 154 which meshes with a stationary rack 156. A suitable screw clamping device 158 may be employed to secure the frame 152 in any desired position of adjustment. A hand-wheel 160 is coupled with the pinion 154 for purposes of convenience.

*Summary*

From the foregoing description it will be seen that the present invention contemplates a new and improved method of cutting gear teeth along the periphery of a continuously rotating gear blank. The apparatus used in the practice of the aforesaid method is extremely simple and compact in structure, and yet very sturdy. The minimum number of constituent co-acting parts and the practical design thereof have resulted in the production of a machine which will insure accurate cutting of teeth along the periphery of a rotating blank. While for the purpose of illustrating one practical adaptation of the invention, the machine has been described in connection with the production of spur and helical gears, it should be understood that the machine is by no means limited to the cutting of such gears.

It should also be understood that cutting tools of different shapes may be employed. The design of the tool is dependent upon the shape of the tooth to be produced. The tool 28 incorporates a tooth form which corresponds in cross-section to the tooth of a conventional rack. That is, it has flat sides angularly disposed with respect to each other in conformity with the required pressure angle of the tooth to be cut. A single cutting tool of such a shape is adapted to produce involute gear teeth in accordance with the rolling generating principle as the gear blank is rotated and linearly translated from one side of the tool to the other. Also, the method and apparatus contemplated by the present invention may be employed in the production of teeth along the periphery of a blank other than those commonly referred to as gear teeth, that is, teeth having any cross sectional profile which may be generated along the periphery of a blank. The variation in tooth form may be accomplished by employing cutting or shaper tools having the form of a conjugate rack tooth.

In the production of teeth such as spur gear teeth, it is essential, as previously pointed out, to move the cutting tool across the periphery of the gear blank at absolute uniform velocity. The cam means previously described accomplishes this end. However, it should also be understood that various forms of cams may be employed. In other words, the invention is not limited to cam means for moving the cutting tool at uniform velocity to produce spur gear teeth, but may be of any desired form depending upon the desired ultimate longitudinal configuration of the teeth being cut. The cam drive for the tool represents one simple and practical actuating means which has proven highly satisfactory in actual use.

The invention has thus far been described in connection with use of a single cutting tool. The use of a single cutting tool has proven very successful, particularly in the production of fine pitch gear teeth. Obviously, in instances where it may be desired to produce a cutting action followed by a finishing action, a tool having more than one work engaging tooth may be employed. In Fig. 18 a tool 28a is illustrated having three teeth. The first tooth at the left would make a roughing cut, the second would produce a finishing effect, and the third could be employed for a burnishing or lapping operation. However, the present invention should be clearly distinguished from apparatus heretofore available wherein relatively long cutting tools in the form of a rack have been used to cut gear teeth in a blank which slowly indexed across the face of the rack. In such devices one tooth on the rack would be used for cutting a given tooth in the gear, as distinguished from the present invention, wherein one or more of the teeth in the cutting tool act upon all of the teeth of the gear blank. That is to say, the present invention contemplates a rapidly actuated tool such as a shaper tool for cutting across the periphery of a blank which also rotates at a relatively rapid rate, thereby enabling the tool to cut every tooth in the blank. It should be apparent that by using the latter arrangement, errors in the resulting gear tooth profile are held to an absolute minimum. Stating it another way, no errors such as are caused by spacing and form errors in a tool having a multiplicity of teeth result from the use of the shaper apparatus described herein.

Attention is again directed to the fact that while for the purpose of illustrating one practical embodiment of the invention, certain details of structure and use have been described herein, it will be apparent that changes and modifications may be made without departing from the spirit and scope of the appended claims.

The invention is hereby claimed as follows:

1. An apparatus for cutting teeth in the periphery of a blank such as a gear blank including a frame structure, a tool slide associated therewith mounted on said frame structure for reciprocation relative thereto and incorporating spaced shoulders, a cutting tool support on said tool slide, a rotary blank support mounted on said frame structure, rotary cam means mounted in the vicinity of said tool slide with the periphery thereof operable between said spaced apart shoulders for effecting reciprocation of said tool slide at uniform cutting velocity whereby to cause a supported tool to cut transversely of the periphery of a supported blank, at a uniform velocity and means for imparting rotation to said cam means and said rotary blank support, said cutting tool support being positioned substantially in the plane of reciprocation of said shoulders normal to the cam axis.

2. In an apparatus as set forth in claim 1, wherein the tool support is pivotally mounted on said slide.

3. In an apparatus as set forth in claim 2, wherein means is provided in association with the cam means for positively shifting said tool support relative to said rotary blank support to effect clearance of a supported tool relative to a supported blank during the non-cutting portion of the cycle of reciprocation.

4. In an apparatus as set forth in claim 1, wherein screw and nut means is provided for effecting translation of the rotary work support with relation to the supported tool.

5. In an apparatus as set forth in claim 1, wherein a splined coupling is provided for effecting rotation of the rotary work support.

6. An apparatus for cutting teeth in the periphery of a blank such as a gear blank including a frame structure, a tool slide mounted on said frame structure for reciprocation relative thereto and having spaced apart shoulders, a tool support on said slide, a rotary blank support mounted on said frame structure, a variable speed prime mover such as an electric motor having a drive shaft, rotary cam means coaxially disposed to and driven from said drive shaft adjacent said tool slide with the periphery of said cam means operable between said spaced shoulders for effecting reciprocation of said tool slide at constant velocity whereby to cause a supported tool to cut transversely of the periphery of a supported blank, and means driven from said prime mover for imparting rotation to said rotary blank support in correlation with the frequency of relative reciprocation of said supports and operable during rotation of said blank support for effecting relative tangential translation of a supported tool and blank whereby respectively to effect cutting of teeth at pre-determined spaced intervals along the periphery and to cause the blank in effect to experience rolling action with respect to a supported tool for the purpose of tooth generation, said tool support being positioned substantially in the plane of reciprocation of said shoulders normal to the cam axis.

7. In an apparatus as set forth in claim 6, wherein the tool slide is adjustably mounted on the frame structure.

8. In an apparatus as set forth in claim 6, wherein the rotary blank support is adjustably mounted on the frame structure to permit adjustment of said support relative to a supported cutting tool mounted on said tool slide.

ANTHONY F. ZAMIS.

REFERENCES CITED

The following references are of record in the file of this patent:

UNITED STATES PATENTS

| Number | Name | Date |
|---|---|---|
| 1,266,839 | Maag | May 21, 1918 |
| 1,290,270 | Maag | Jan. 7, 1919 |
| 1,454,430 | Eberhardt | May 8, 1923 |
| 2,309,530 | Perkins | Jan. 26, 1943 |
| 2,426,774 | Jury | Sept. 2, 1947 |